United States Patent
Lee et al.

(10) Patent No.: US 10,397,508 B2
(45) Date of Patent: Aug. 27, 2019

(54) IMAGE SENSOR HAVING LED FLICKER MITIGATION FUNCTION AND IMAGE PROCESSING SYSTEM INCLUDING THE IMAGE SENSOR

(71) Applicant: Samsung Electronics Co., Ltd., Suwon-si, Gyeonggi-do (KR)

(72) Inventors: Hyeok Jong Lee, Seongnam-si (KR); Se-Jun Kim, Seoul (KR); Tomotasu Tate, Suwon-si (KR); Jin-Kyeong Heo, Hwaseong-si (KR)

(73) Assignee: SAMSUNG ELECTRONICS CO., LTD., Gyeonggi-do (KR)

( * ) Notice: Subject to any disclaimer, the term of this patent is extended or adjusted under 35 U.S.C. 154(b) by 83 days.

(21) Appl. No.: 15/435,895

(22) Filed: Feb. 17, 2017

(65) Prior Publication Data
US 2017/0264845 A1    Sep. 14, 2017

(30) Foreign Application Priority Data
Mar. 8, 2016 (KR) .................. 10-2016-0027717

(51) Int. Cl.
*H04N 5/232* (2006.01)
*H04N 5/235* (2006.01)
(Continued)

(52) U.S. Cl.
CPC ....... *H04N 5/37452* (2013.01); *H04N 5/2357* (2013.01); *H04N 5/3594* (2013.01);
(Continued)

(58) Field of Classification Search
CPC ......... H04N 5/2357; H04N 5/335–378; H04N 5/37452; H04N 5/23245; H01L 27/146–14676
See application file for complete search history.

(56) References Cited

U.S. PATENT DOCUMENTS

| | | | |
|---|---|---|---|
| 6,507,365 B1 | 1/2003 | Nakamura et al. | |
| 6,903,778 B1 * | 6/2005 | Kaku ..................... | H04N 5/232 |
| | | | 348/333.13 |

(Continued)

FOREIGN PATENT DOCUMENTS

| | | |
|---|---|---|
| JP | 4497366 B2 | 7/2010 |
| KR | 100865111 B1 | 10/2008 |

(Continued)

*Primary Examiner* — Paul M Berardesca
(74) *Attorney, Agent, or Firm* — Harness, Dickey & Pierce, P.L.C.

(57) ABSTRACT

Disclosed are an image sensor having a light-emitting diode (LED) flicker mitigation function and an image processing system including the image sensor. The image processing system includes an image sensor including a plurality of pixels, the plurality of pixels configured to respectively generate pixel signals corresponding to photocharges, and configured to perform analog-to-digital conversion (ADC) on the pixel signals to generate digital pixel signals; and an image signal processor configured to process the digital pixel signals to generate image data. The image sensor operates in a first operating mode in a situation in which a light-emitting diode (LED) light is provided, and operates in a second operating mode in a general situation in which the LED light is not provided.

15 Claims, 10 Drawing Sheets

(51) Int. Cl.
*H04N 5/359* (2011.01)
*H04N 5/374* (2011.01)
*H04N 5/376* (2011.01)
*H04N 5/378* (2011.01)
*H04N 5/3745* (2011.01)

(52) U.S. Cl.
CPC ............. *H04N 5/374* (2013.01); *H04N 5/378* (2013.01); *H04N 5/3765* (2013.01); *H04N 5/37457* (2013.01); *H04N 5/23245* (2013.01)

(56) References Cited

U.S. PATENT DOCUMENTS

| | | |
|---|---|---|
| 7,489,352 B2 | 2/2009 | Nakamura |
| 8,059,174 B2 | 11/2011 | Mann et al. |
| 8,502,895 B2 | 8/2013 | Yosefin |
| 8,710,419 B2 | 4/2014 | Bogaerts |
| 8,773,562 B1 | 7/2014 | Fan |
| 2013/0188078 A1 | 7/2013 | Shim et al. |
| 2015/0146060 A1* | 5/2015 | Suzuki ................ H04N 5/3559 348/300 |
| 2015/0208009 A1 | 7/2015 | Oh et al. |
| 2016/0056199 A1* | 2/2016 | Kim ................. H01L 27/14643 250/208.1 |
| 2016/0099268 A1* | 4/2016 | Minowa ............ H01L 27/14603 250/208.1 |
| 2016/0111461 A1* | 4/2016 | Ahn ................. H01L 27/14614 250/208.1 |
| 2016/0156863 A1* | 6/2016 | Kim ....................... H04N 5/374 348/308 |
| 2017/0244921 A1* | 8/2017 | Velichko ........... H01L 27/14627 |
| 2018/0115730 A1* | 4/2018 | Velichko .............. H04N 5/2253 |

FOREIGN PATENT DOCUMENTS

| | | |
|---|---|---|
| KR | 20110037187 A | 4/2011 |
| KR | 101277990 B1 | 6/2013 |
| KR | 20130085228 A | 7/2013 |
| KR | 20150087032 A | 7/2015 |

* cited by examiner

IMAGE SENSOR HAVING LED FLICKER MITIGATION FUNCTION AND IMAGE PROCESSING SYSTEM INCLUDING THE IMAGE SENSOR

CROSS-REFERENCE TO RELATED APPLICATION

This application claims the benefit of Korean Patent Application No. 10-2016-0027717 filed on Mar. 8, 2016, in the Korean Intellectual Property Office, the disclosure of which is incorporated herein in its entirety by reference.

BACKGROUND

An image sensor is a device which converts an optical image into an electrical signal. The image sensor is used in a digital camera or other image processing devices. The image sensor includes a plurality of pixels.

In general, a mechanical shutter method or an electrical shutter method is used to control an exposure time that determines the amount of photocharges on which the electrical signal is based.

First, in the mechanical shutter method, light to be incident on the plurality of pixels is physically blocked by using a mechanical device.

Second, the electrical shutter method is employed mainly in a complementary metal-oxide semiconductor (CMOS) image sensor (hereinafter referred to as a CIS). In the electrical shutter method, an integration time during which the photocharges are generated and accumulated is electrically controlled.

Examples of the electrical shutter method include a rolling shutter method and a global shutter method.

In the rolling shutter method, the integration time is controlled to be different in units of rows of a pixel array. In the global shutter method, the integration time is controlled to be the same with respect to all the rows of the pixel array.

A light-emitting diode (LED) light has been widely used in a traffic light, a speed-limit sign, etc. The LED light has a specific low-frequency component. That is, in the case of the LED light, an 'on' period (a period in which an LED is 'on') and an 'off' period (a period in which the LED is 'off') are alternately repeated at specific intervals of time, thereby causing flickering to occur.

SUMMARY

A CIS may not be capable of sensing an image. For example, if a traffic light or a speed-limit sign is manufactured using an LED, an image sensor of a camera may not be capable of appropriately recognizing an object when an image of the object is captured in the 'off' period.

One or more example embodiments of inventive concepts relate to an image sensor and/or an image processing system including the same, such as an image sensor having a light-emitting diode (LED) flicker mitigation function and an image processing system including the same.

According to an aspect of inventive concepts, an image sensor includes a pixel array including a plurality of pixels, the plurality of pixels configured to respectively generate pixel signals corresponding to photocharges, and an analog-to-digital conversion (ADC) circuit configured to convert the pixel signals into digital pixel signals.

The pixel array includes a floating diffusion node, a first photoelectric conversion element operably connected to the floating diffusion node, and a second photoelectric conversion element operably connected to the floating diffusion node via the first photoelectric conversion element.

The ADC circuit is configured to perform ADC on a reset signal of the floating diffusion node, perform ADC on a first pixel signal based on a first photocharge accumulated in the first photoelectric conversion element, and perform ADC on a second pixel signal based on a second photocharge accumulated in the second photoelectric conversion element.

According to another aspect of inventive concepts, an image processing system includes an image sensor including a plurality of pixels, the plurality of pixels configured to respectively output pixel signals corresponding to photocharges, and configured to perform analog-to-digital conversion (ADC) on the pixel signals to generate digital pixel signals and an image signal processor configured to process the digital pixel signals to generate image data.

The image sensor is configured operate in a first operating mode in a situation in a light-emitting diode (LED) light environment, and operate in a second operating mode in a no LED light environment.

According to another aspect of inventive concepts, an image processing system includes a pixel array including a plurality of pixels, at least one pixel of the plurality of pixels further including, a floating diffusion node, a first photoelectric conversion element operably connected to the floating diffusion node, and a second photoelectric conversion element operably connected to the floating diffusion node via the first photoelectric conversion element. The image processing system also includes a readout circuit configured to read a photocharge accumulated at the floating diffusion node a first number of times in a first mode and a second number of times in a second mode.

BRIEF DESCRIPTION OF THE DRAWINGS

Example embodiments of inventive concepts will be more clearly understood from the following detailed description taken in conjunction with the accompanying drawings in which.

DETAILED DESCRIPTION OF EXAMPLE EMBODIMENTS

Figure 1:
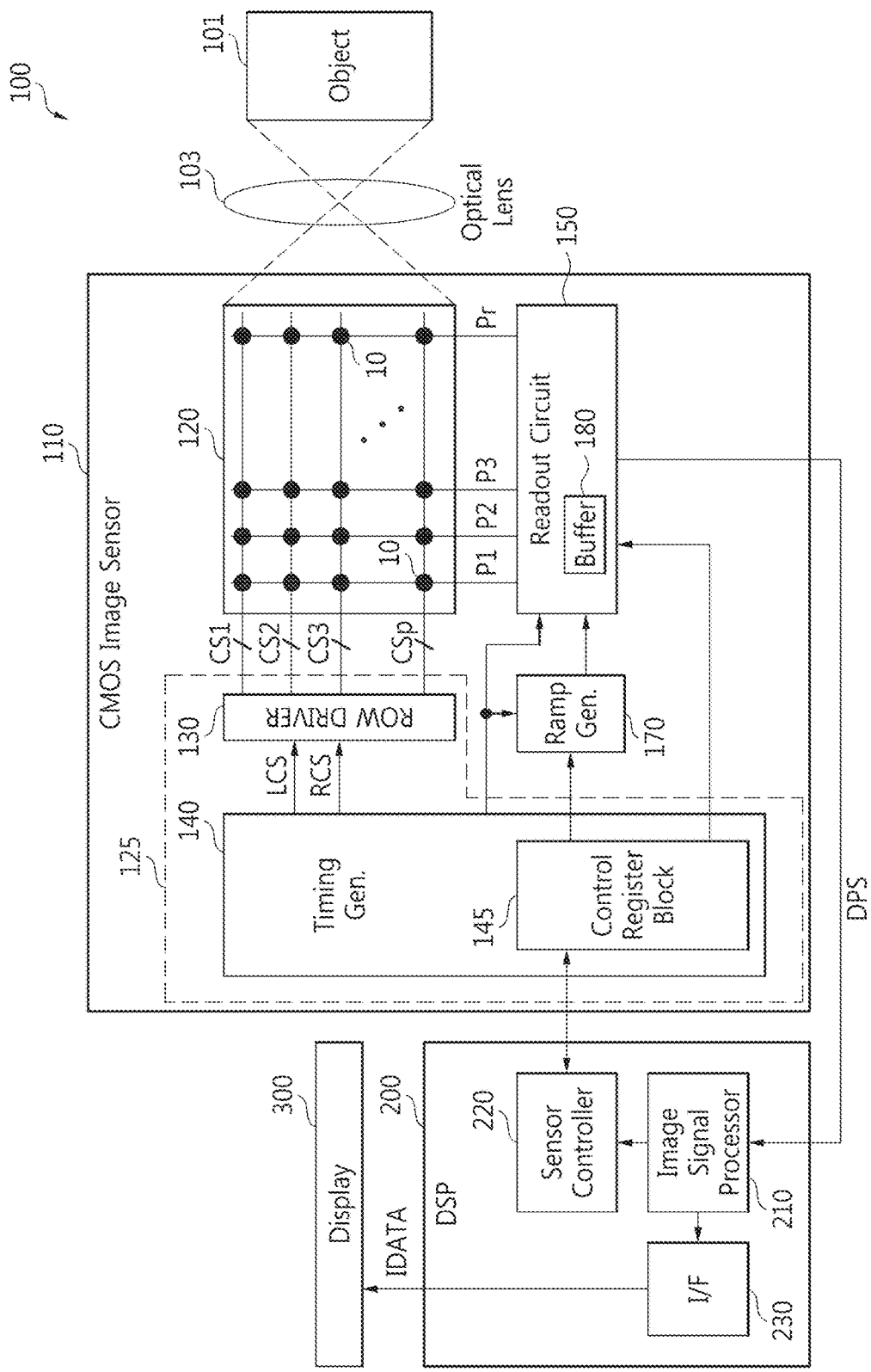
FIG. 1 is a block diagram of an image processing system according to an example embodiment of inventive concepts.
Figure 2:
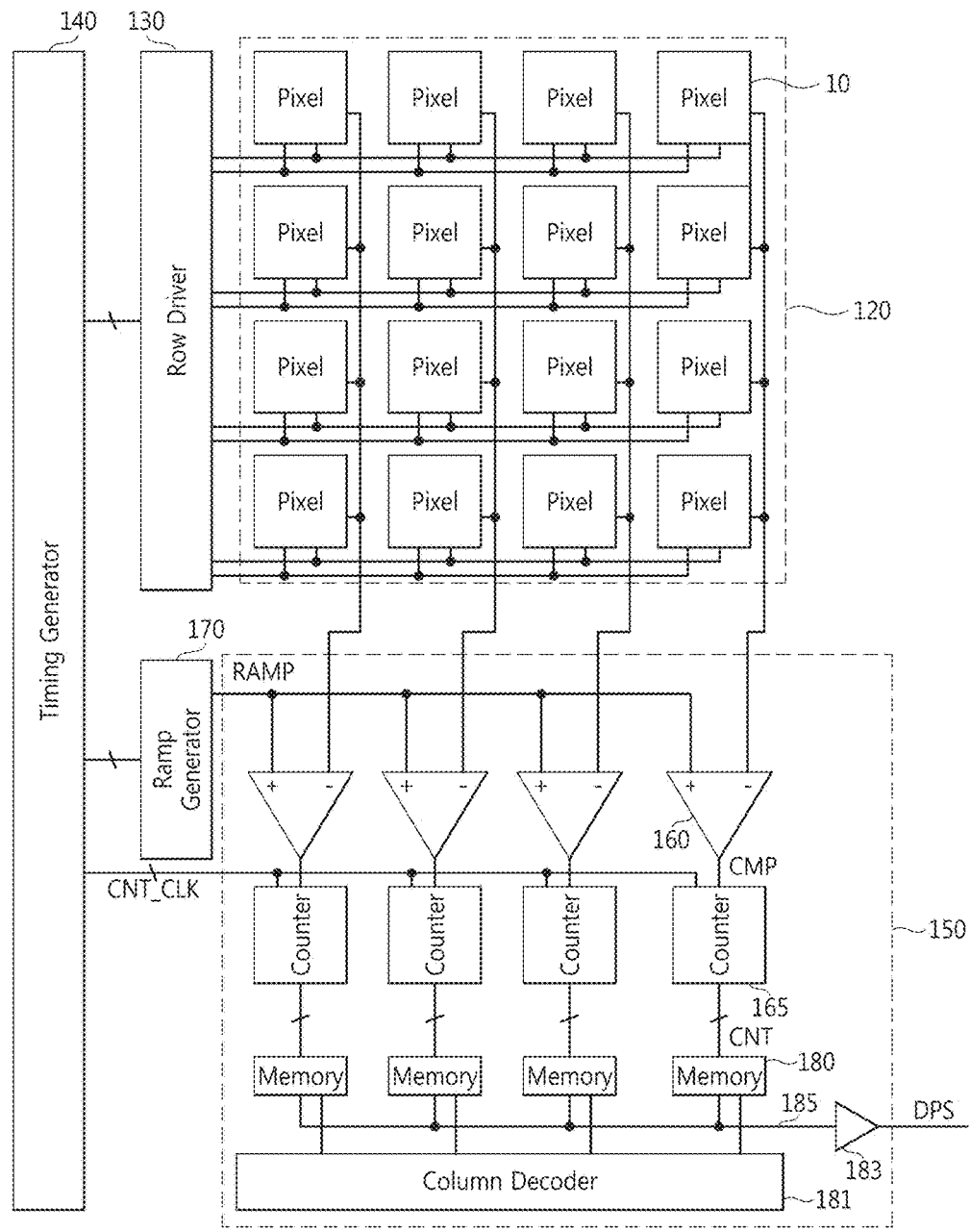
FIG. 2 is a detailed block diagram of an image sensor of FIG. 1, according to an example embodiment.

FIG. 1 is a block diagram of an image processing system 100 according to an example embodiment of inventive concepts. FIG. 2 is a detailed block diagram of a complementary metal-oxide semiconductor (CMOS) image sensor (CIS) 110 of FIG. 1.

Referring to FIGS. 1 and 2, the image processing system 100 may be embodied in a portable electronic device. The portable electronic device may be a laptop computer, a mobile phone, a smart phone, a tablet personal computer (PC), a personal digital assistant (PDA), an enterprise digital assistant (EDA), a digital still camera, a digital video camera, a portable multimedia player (PMP), a mobile internet device (MID), a wearable computer, an internet-of-things (IoT) device, or an internet-of-everything (IoE) device.

The image processing system 100 includes an optical lens 103, the CIS 110, a digital signal processor (DSP) 200, and a display 300. The CIS 110 and the DSP 200 may be each embodied as a chip.

The CIS 110 may generate a digital pixel signal DPS of an image of an object 101 which is input (or captured) through the optical lens 103.

The CIS 110 includes a pixel array (or an active pixel sensor (APS) array) 120, a control block 125, a readout circuit 150, a ramp signal generator 170, and a buffer 180.

The CIS 110 may be configured to perform two or more operating modes (e.g., a first operating mode and a second operating mode).

The CIS 110 may perform a global shutter operation in the second operating mode (e.g., a normal mode).

The global shutter operation may be a method of controlling an integration period, in which photocharges are accumulated by photoelectric conversion elements (e.g., a photodiode PD of FIG. 3) included in the pixel array 120, to be the same with respect to all rows of the pixel array 120.

In one example embodiment, the integration time may be the same for all the rows or may be the same for a certain group of rows (e.g., even-numbered rows or odd-numbered rows). The integration time means a time during which photocharges are actually accumulated by the photodiode PD.

The CIS 110 may perform a rolling shutter operation in the first operating mode (e.g., an LED mitigation mode).

The rolling shutter operation may be understood as a method of controlling the integration period, in which photocharges are accumulated by the photoelectric conversion elements (e.g., the photodiode PD of FIG. 3) included in the pixel array 120, to be different in units of the rows of the pixel array 120.

An operating mode of the CIS 110 may be set by the DSP 200.

Figure 9:
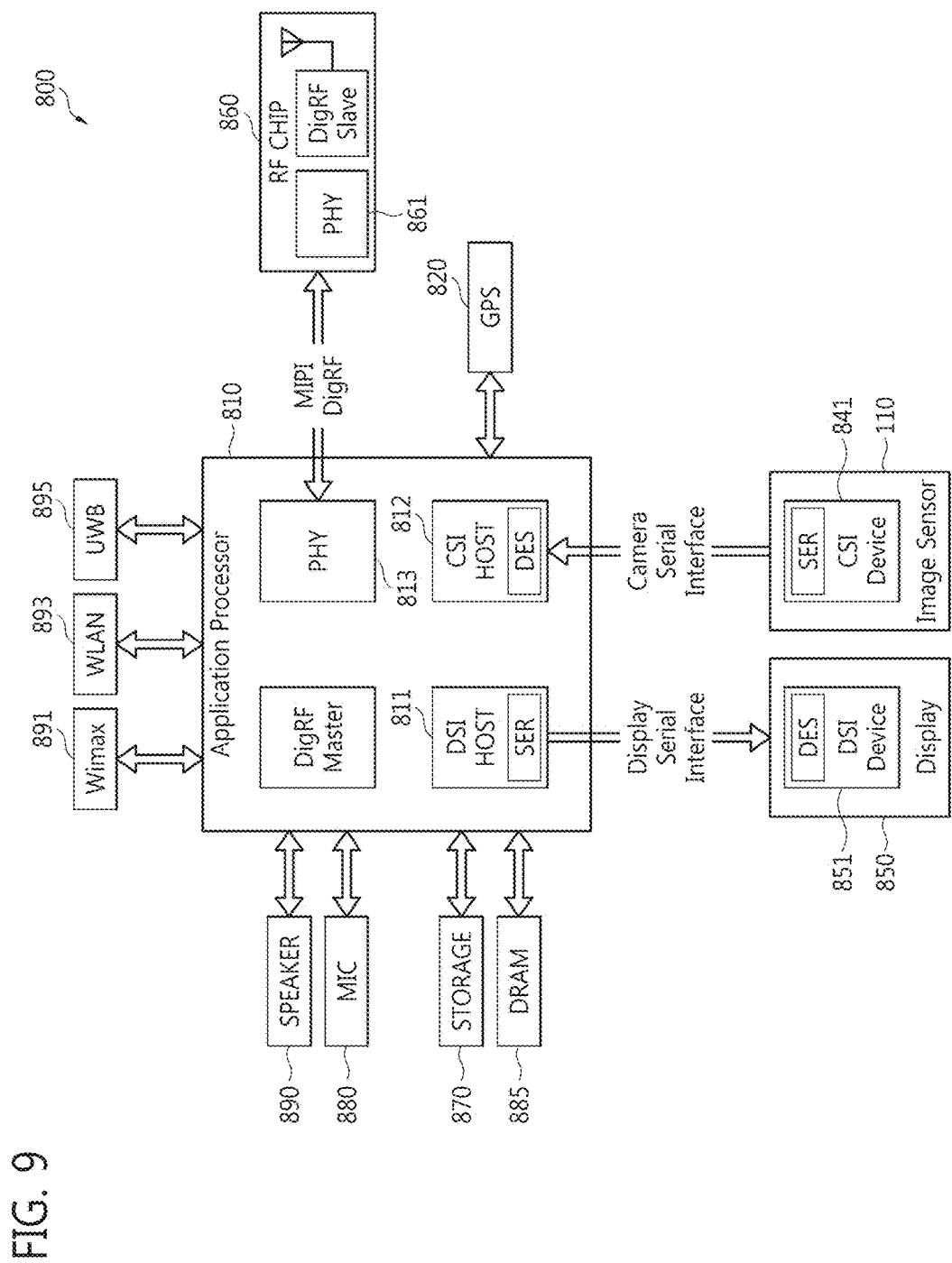
FIG. 9 is a block diagram of an electronic system including the image sensor according to some example embodiments of inventive concepts.
Figure 10:
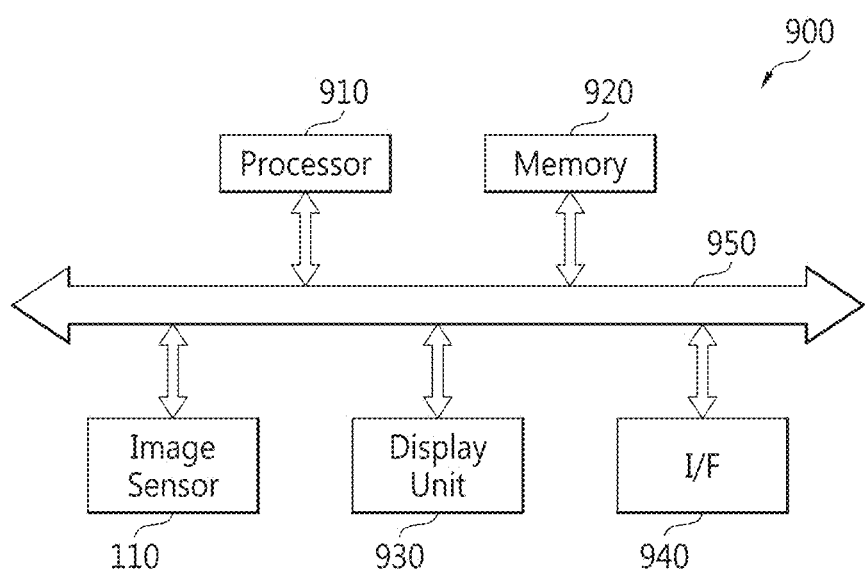
FIG. 10 is a block diagram of an electronic system including the image sensor according to some example embodiments of inventive concepts.

Alternatively, the operating mode of the CIS 110 may be set by, for example, one of the DSP 200, a processor 810, and a processor 910 respectively included in the system 100, a system 800 of FIG. 9, and a system 900 of FIG. 10, each of which includes the CIS 110.

For example, the operating mode of the CIS 110 may be set to the second operating mode in a general situation in which there is no LED.

In contrast, the operating mode of the CIS 110 may be set to the first operating mode in a situation in which there is an LED. For example, the processor 200, 810, or 910 of the system 100, 800, or 900 may recognize an image from a camera to determine whether there is an LED, and control the operating mode of the CIS 110 according to a result of recognizing the image.

The pixel array 120 may include a plurality of pixels 10 arranged in the form of a matrix, in which each of the plurality of pixels 10 is connected to one of a plurality of row lines and one of a plurality of column lines.

The plurality of pixels 10 may include, but are not limited to, a red filter which transmits light of a red wavelength region, a green filter which transmits light of a green wavelength region, and a blue filter which transmits light of a blue wavelength region. In one example embodiment, the plurality of pixels 10 may include a white filter, a cyan filter, a magenta filter, and/or a yellow filter.

The plurality of pixels 10 may each include a plurality of transistors (two or more transistors) and a photoelectric conversion element (e.g., a photodiode or a pinned photodiode). Each of the plurality of pixels 10 senses light and converts the light into an electrical signal to generate an image signal by using the photoelectric conversion element.

A structure and operation of each of the plurality of pixels 10 will be described in detail with reference to FIG. 3 below. The plurality of pixels 10 form one pixel array 120 together and thus each of the plurality of pixels 10 may be referred to as a unit pixel.

The control block 125 may control overall operations of the CIS 110, and include a row driver 130 and a timing generator 140.

The row driver 130 may transmit a plurality of row control signals CS1 to CSp for respectively controlling the plurality of pixels 10 to the pixel array 120, under control of the timing generator 140. That is, the row driver 130 may generate the plurality of row control signals CS1 to CSp, based on a plurality of row driver control signals RCS received from the timing generator 140. The plurality of row control signals CS1 to CSp respectively correspond to p rows of the pixel array 120 and may be thus considered as being controlled in units of the rows of the pixel array 120.

Figure 3:
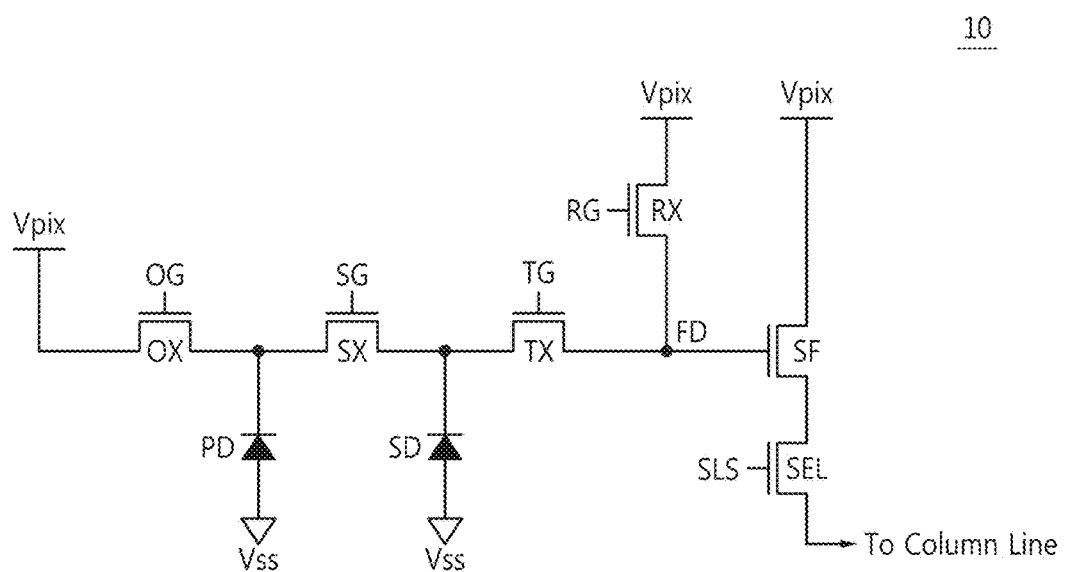
FIG. 3 is a circuit diagram of a pixel of FIG. 1 according to an example embodiment.
Figure 6:
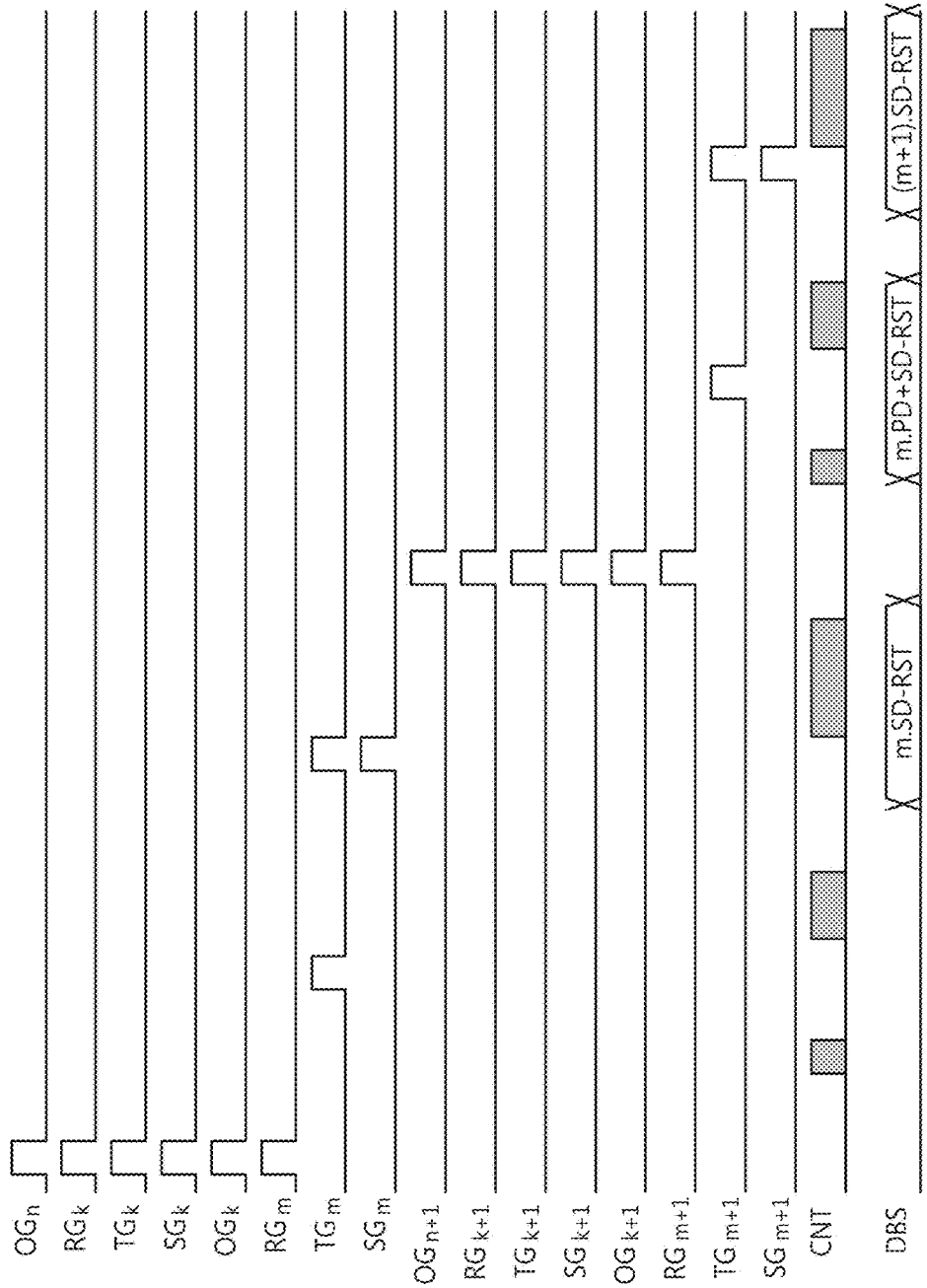
FIG. 6 is a schematic signal timing diagram of an image sensor in the first operating mode, according to an example embodiment of inventive concepts.

The plurality of row control signals CS1 to CSp may include an overflow control signal OG, a storage control signal SG, a transmission control signal TG, a reset control signal RG, and a selection control signal SLS illustrated in FIGS. 3 and 6.

In the pixel array 120, an image signal is output to the readout circuit 150 from at least one row selected in response to the row control signals CS1 to CSp provided from the row driver 130.

The timing generator 140 may include a control register block 145. The control register block 145 controls operations of the timing generator 140, a ramp signal generator 170, and a buffer 180, under control of the DSP 200.

The timing generator 140 controls operations of the row driver 130, the readout circuit 150, the ramp signal generator 170, and the buffer 180, under control of the control register block 145.

The timing generator 140 may generate the row driver control signals RCS such that the CIS 110 operates differently according to an operating mode.

Referring to FIG. 2, the readout circuit 150 may include a plurality of correlated double sampling (CDS) circuits 160, a plurality of counters 165, a plurality of buffers 180, a column decoder 181, a sense amplifier 183, and a data bus 185.

The CDS circuits 160 may perform CDS on pixel signals P1 to Pr output from the plurality of column lines of the pixel array 120. Here, 'r' denotes a natural number.

Each of the CDS circuits 160 may compare a pixel signal on which CDS is performed and a ramp signal RAMP output from the ramp signal generator 170 (for example, a voltage of this pixel signal and a voltage of the ramp signal RAMP) with each other, and output a comparison signal CMP according to a result of comparing these signals.

For example, each of the CDS circuits 160 may pick up the difference between an image signal and the reset signal RST by using the ramp signal RAMP to output the difference between the image signal and the reset signal RST, and output the comparison signal CMP according to a slope of the signal RAMP. The ramp signal generator 170 may operate based on a control signal generated by the timing generator 140.

Each of the counters 165 may convert the comparison signal CMP output from one of the CDS circuits 160 into a digital signal CNT, and output the digital signal CNT to one of the buffers 180.

For example, each of the counters 165 is connected to an output terminal of one of the CDS circuits 160, and counts the comparison signal CMP and outputs the digital signal CNT according to a clock signal CNT_CLK received from the timing generator 140.

The pixel signals P1 to Pr output from the plurality of column lines are converted into digital signals through the CDS circuits 160 and the counters 165. Thus, the CDS circuits 160 and the counters 165 may correspond to analog-to-digital converters.

The clock signal CNT_CLK may be generated by a counter controller (not shown) included in either a counter (not shown) or the timing generator 140, based on a counter control signal generated by the timing generator 140.

The readout circuit 150 transmits, to the DSP 200, a plurality of digital pixel signals DPS corresponding to a plurality of digital signals output by the counters 165 via the sense amplifier 183.

Referring back to FIG. 1, the DSP 200 includes an image signal processor 210, a sensor controller 220, and an interface 230.

The image signal processor 210 controls the sensor controller 220 and the interface 230. The sensor controller 220 controls the control register block 145. In one example embodiment, the CIS 110 and the DSP 200 may be each embodied as a chip, and may form one package, e.g., a multi-chip package. In another example embodiment, the CIS 110 and the image signal processor 210 may be each embodied as a chip, and may form one package, e.g., a multi-chip package. In another embodiment, the CIS 110 and the image signal processor 210 may be embodied as one chip.

The image signal processor 210 processes the digital pixel signals DPS received from the readout circuit 150 to obtain image data IDATA, and transmits the image data IDATA to the interface 230.

The sensor controller 220 generates various control signals for controlling the control register block 145 under control of the image signal processor 210. The interface 230 transmits the image data IDATA obtained by the image signal processor 210 to the display 300.

The display 300 displays the image data IDATA received from the interface 230. For example, the display 300 may be embodied as a thin-film transistor-liquid crystal display (TFT-LCD), a light-emitting diode (LED) display, an organic LED (OLED) display, or an active-matrix OLED (AMOLED) display.

FIG. 3 is a circuit diagram of one of the pixels 10 illustrated in FIG. 1.

Referring to FIGS. 1 through 3, the pixel 10 includes first and second photoelectric conversion elements SD and PD, an overflow transistor OX, a storage transistor SX, a transmission transistor TX, a reset transistor RX, a source follower SF, and a selection transistor SEL.

The second photoelectric conversion element PD may be embodied as a photodiode PD. The photodiode PD accumulates (or collects) photocharges generated in response to incident light. The photodiode PD is an example of a photoelectric conversion element, and may include a photodiode, a phototransistor, a photogate, a pinned photodiode (PPD), or a combination thereof.

The overflow transistor OX is connected between a pixel voltage Vpix source and the photodiode PD. A gate of the overflow transistor OX is used to prevent electric charges generated by the photodiode PD from overflowing to the second photoelectric conversion element SD. The overflow transistor OX is 'on' or 'off' in response to an overflow control signal OG supplied to the gate thereof.

The first photoelectric conversion element SD which is also referred to as a storage diode SD stores the electric charges transmitted from the photodiode PD. The storage diode SD may be embodied as having a structure similar to that of the photodiode PD or as a capacitor.

However, the storage diode SD may have lower optical sensitivity that that of the photodiode PD. For example, if it is assumed that the storage diode SD and the photodiode PD receive the same intensity of incident light for the same time, the number of photocharges accumulated in the storage diode SD may be much less than that of photocharges accumulated in the photodiode PD.

In one example embodiment, the sensitivity of the photodiode PD versus the sensitivity of the storage diode SD may be expressed by Equation 1 below but example embodiments of inventive concepts are not limited thereto.

$$20 \log(\text{Sen.PD}/\text{Sen.SD}) = 80\text{-}100 \text{ dB}, \quad \text{[Equation 1]}$$

wherein "Sen.SD" denotes the sensitivity of the storage diode SD, and "Sen.PD" denotes the sensitivity of the photodiode PD.

The photodiode PD and the storage diode SD may be connected to a ground voltage VSS source.

A pixel voltage Vpix may be equal to or less than a power supply voltage, e.g., 5V, but example embodiments of inventive concepts are not limited thereto.

For example, the overflow transistor OX is used to prevent photocharges (e.g., electrons) generated by the photodiode PD from overflowing to the storage diode SD when the intensity of light incident on the pixel 10 is high (when the sun, a light bulb, or the like is photographed, i.e., when the level of illumination is high) or when photocharges generated in a period other than an integration period are accumulated in the photodiode PD.

Furthermore, the overflow transistor OX is used to remove (or reset) photocharges accumulated in the photodiode PD right before the start of the integration period.

The storage transistor SX is connected between the photodiode PD and the storage diode SD. Electric charges transmitted from the photodiode PD are stored in the storage diode SD via the storage transistor SX. The storage transistor SX is 'on' or 'off' in response to a storage control signal SG supplied to a gate of the storage transistor SX.

The transmission transistor TX is connected between the storage diode SD and a floating diffusion node FD. The electric charges stored in the storage diode SD are stored (or accumulated) in the floating diffusion node FD via the transmission transistor TX. The transmission transistor TX is 'on' or 'off' in response to a transmission control signal TG supplied to a gate thereof.

The reset transistor RX is connected between the pixel voltage Vpix source and the floating diffusion node FD, and is 'on' or 'off' in response to a reset control signal RG supplied to a gate thereof.

The reset transistor RX may remove photocharges (e.g., electrons) from the floating diffusion node FD in response to the reset control signal RS. That is, when the reset transistor RX is 'on', a voltage of the floating diffusion node FD may be reset to the pixel voltage Vpix.

The source follower SF is connected between the pixel voltage Vpix source and the selection transistor SEL, and operates based on a voltage determined according to electric charges in the floating diffusion node FD.

Although for convenience of explanation, FIG. 3 illustrates that the pixel voltage Vpix is commonly applied to the overflow transistor OX, the reset transistor RX, and the source follower SF, operating voltages to be respectively applied to the overflow transistor OX, the reset transistor RX, and the source follower SF may be designed to be different according to some example embodiments.

The selection transistor SEL may output an output signal of the source follower SF, e.g., an analog pixel signal, to a column line, in response to the selection control signal SLS.

Figure 4:
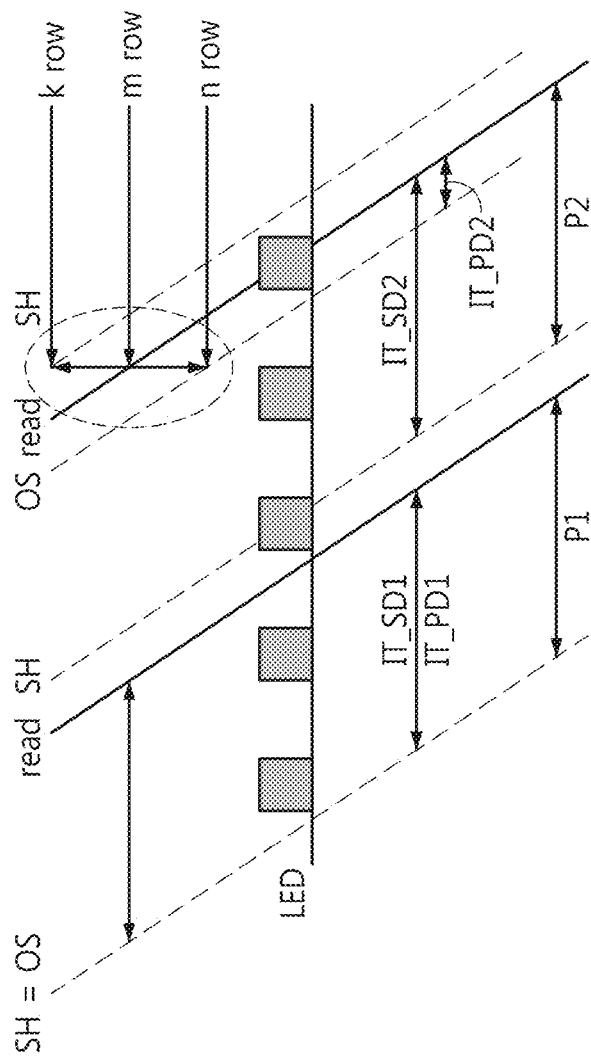
FIG. 4 is a schematic operation timing diagram illustrating an operation of an image sensor according to an example embodiment of inventive concepts.

FIG. 4 is a schematic operation timing diagram illustrating an operation of an image sensor according to an example embodiment of inventive concepts.

In FIG. 4, 'SH' may be understood as a time when transistors (e.g., the reset transistor RX, the storage transistor SX, and the transmission transistor TX) except the overflow transistor OX among the transistors of the pixel 10 are to be 'on', i.e., a shutter time.

In FIG. 4, 'OS' may mean a time when the overflow control signal OG supplied to the gate of the overflow transistor OX goes to a logic high level. Thus, 'OG' may be understood as a time when the overflow transistor OX is 'on', i.e., a reset time when the photodiode PD is reset.

The shutter time SH and the reset time OS of the photodiode PD may be controlled to be the same or different.

In FIG. 4, in a first period P1, the shutter time SH and the reset time OS of the photodiode PD are controlled to be the same. For example, the overflow control signal OG, a storage control signal SG, the transmission control signal TG, and the reset control signal RG may be simultaneously enabled to a logic high level '1' with respect to one or more rows.

Thus, all the overflow transistor OX, the storage transistor SX, the transmission transistor TX, and the reset transistor RX corresponding to the one or more rows are 'on', thereby resetting all the photodiode PD, the storage diode SD, and the floating diffusion node FD.

As described above, the photodiode PD and the storage diode SD are simultaneously reset, and start to accumulate photocharges at the same time.

In FIG. 4, 'read' means a time when a pixel signal is read out based on the photocharges stored in the photodiode PD and the storage diode SD and a selection signal of the corresponding pixel activates the selection transistor. The reading out of the pixel signal will be described in detail with reference to FIGS. 5 and 6 below.

Thus, in the first period P1, an integration time IT_PD1 of the photodiode PD and an integration time IT_SD1 of the storage diode SD are substantially the same.

In contrast, in a second period P2, the shutter time SH and the reset time OS of the photodiode PD are controlled to be different. For example, with respect to one or more rows, the storage control signal SG, the transmission control signal TG, and the reset control signal RG are simultaneously enabled to '1' at the shutter time SH but the overflow control signal OG is enabled to '1' at a time later than the shutter time SH.

Thus, at the shutter time SH, the storage transistor SX, the transmission transistor TX, and the reset transistor RX corresponding to the one or more rows are 'on' to reset both the storage diode SD and the floating diffusion node FD.

In contrast, the photodiode PD is reset at a time when the overflow control signal OG is enabled to cause the overflow transistor OX to be 'on'.

Thus, the storage diode SD is reset to start accumulation of photocharges at the shutter time SH, and thereafter, the photodiode PD is reset to start accumulation of photocharges when the overflow control signal OG is enabled.

Thus, in the second period P2, an integration time IT_PD2 of the photodiode PD is shorter than an integration time IT_SD2 of the storage diode SD.

The first period P1 and the second period P2 may belong to different frames.

For example, the shutter time SH and/or the reset time OS of the photodiode PD may be controlled to be different in units of frames.

Figure 5:
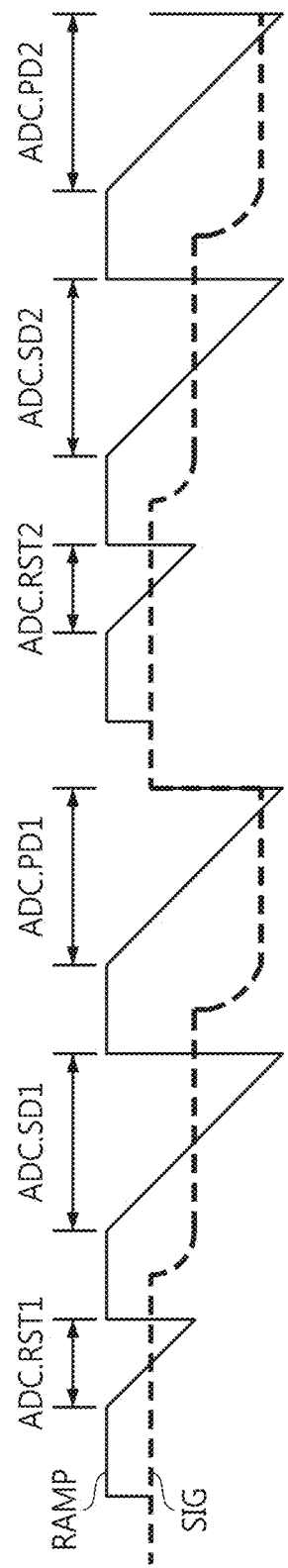
FIG. 5 is a diagram illustrating an analog-to-digital conversion (ADC) operation of an image sensor in a first operating mode, according to an example embodiment of inventive concepts.

FIG. 5 is a diagram illustrating an ADC operation of an image sensor in the first operating mode, according to an example embodiment of inventive concepts. FIG. 6 is a schematic signal timing diagram of an image sensor in the first operating mode, according to an example embodiment of inventive concepts.

Referring to FIGS. 1 to 6, in the first operating mode, the ADC circuits 160 and 165 of the CIS 110 may convert a reset signal of the floating diffusion node FD of a selected pixel 10 into a digital signal (ADC.RST1). A pixel signal SIG is illustrated with respect to the timing shown in FIG. 5.

Next, the ADC circuits 160 and 165 may convert a first image signal based on a first photocharge accumulated in the storage diode SD into a digital signal (ADC.SD1) and then may convert a second image signal based on a second photocharge accumulated in the photodiode PD into a digital signal (ADC.PD1).

Referring to FIG. 6, the overflow control signal OG may be enabled with respect to an $n^{th}$ row at a certain time. Photodiodes PD of pixels belonging to the $n^{th}$ row may be reset in response to the overflow control signal OG. For example, while the overflow control signal OG is in a logic high level, the photodiodes PD are reset as electric charges stored therein are discharged to the pixel voltage Vpix source.

As the overflow control signal OG which is in the logic high level goes to a logic low level, accumulation of photocharges may be started by the photodiodes PD. The photodiodes PD starting the accumulation of photocharges may accumulate electric charges generated from incident light until a pixel signal of the $n^{th}$ row is read out.

A reset control signal RGk, a storage control signal SGk, and a transmission control signal TGk may be simultaneously enabled to '1' with respect to a $k^{th}$ row at the time when the overflow control signal OG of the $n^{th}$ row is enabled.

Thus, all a storage transistor SX, a transmission transistor TX, and a reset transistor RX of each of pixels belonging to the $k^{th}$ row are 'on' to reset all the storage diodes SD and the floating diffusion nodes FD in the $k^{th}$ row.

For example, while the reset control signal RGk, the storage control signal SGk, and the transmission control signal TGk are in the logic high level, the storage diodes SD and the floating diffusion nodes FD may be reset as electric charges stored in the storage diodes SD are discharged to the pixel voltage Vpix source.

As the reset control signal RGk, the storage control signal SGk, and the transmission control signal TGk go to the logic low level, accumulation of photocharges may be started by the storage diodes SD. That is, the accumulation of photocharges is started after the storage diodes SD in the $k^{th}$ row are reset.

The storage diodes SD starting the accumulation of photocharges may accumulate electric charges generated from incident light until a pixel signal of the $k^{th}$ row is read out.

Furthermore, a reset control signal RGm may be enabled to '1' with respect to an $m^{th}$ row at the time when the overflow control signal OG of the $n^{th}$ row is enabled.

In the embodiment of FIG. 6, the photodiodes PD of the pixels in the $n^{th}$ row and the storage diodes SD of the pixels in the $k^{th}$ row are reset in synchronization with a time when the floating diffusion nodes FD in the $m^{th}$ row is reset, in order to read out a pixel signal of the $m^{th}$ row.

Here, 'k', 'm', and 'n' may each denote one of natural numbers ranging from '1' to 'p'. In one embodiment, 'k', 'm', and 'n' may be different from one another. For example, when the pixel signal of the $m^{th}$ row is read out, photodiodes PD in another row (e.g., the $n^{th}$ row) may be controlled to accumulate photocharges and storage diodes SD in another row (e.g., the $k^{th}$ row) may be controlled to accumulate photocharges.

As described above, the photodiodes PD and the storage diodes SD may be controlled to be reset at different times. Thus, photocharge integration times of the photodiodes PD and photocharge integration times of the storage diodes SD may be different.

For example, when 'm' is greater than 'k' and 'n' is greater than 'm', the photocharge integration times of the photodiodes PD may be roughly equal to a time corresponding to an $(n-m)^{th}$ row, and the photocharge integration times of the storage diodes SD may be equal to a time corresponding to a (1 frame-$(m-k)^{th}$ row).

In one example embodiment, a time when the photodiodes PD are reset and a time when the storage diodes SD are reset may be controlled to be the same. Thus the photocharge integration times of the photodiodes PD and the photocharge integration times of the storage diode SD may be the same.

For example, if 'k' and 'n' are the same, when, for example, the pixel signal of the $m^{th}$ row is read out, photodiodes PD and storage diodes SD in another row, e.g., the $n^{th}$ row, may be simultaneously reset to accumulate photocharges at the same time (e.g., the $n^{th}$ row).

As described above, according to an example embodiment of inventive concepts, the photocharge integration times of the storage diodes SD are equal to or longer than those of the photodiodes PD.

In the example embodiment of FIG. 6, the CIS 110 enables the reset control signal RGm to reset the floating diffusion node FD and then reads out a reset signal with respect to the $m^{th}$ row. Thus, as illustrated in FIG. 5, ADC is performed on the reset signal (ADC.RST1)

After the reset signal is read out, the CIS 110 enables a transmission control signal TGm of the $m^{th}$ row to transmit the first photocharge accumulated in the storage diode SD to the floating diffusion node FD, and reads out a pixel signal of the floating diffusion node FD. Thus, as illustrated in FIG. 5, ADC is performed on the pixel signal based on the storage diode SD (ADC.SD1).

After the pixel signal based on the storage diodes SD is read out, the CIS 110 simultaneously enables the transmission control signal TGm and a storage control signal SGm of the $m^{th}$ row to transmit the second photocharge accumulated in the photodiode PD to the storage diodes SD.

Thus, stored first photocharge and the second photocharge transmitted from the photodiodes PD may be combined in the storage diodes SD.

A result of combining the first and photocharges in the storage diodes SD and PD is transmitted to the floating diffusion node FD and is then read out.

Thus, as illustrated in FIG. 5, ADC is performed on a pixel signal based on the photodiode PD (ADC.PD1).

Accordingly, in the first operating mode, ADC is successively performed three times to read out a pixel signal from a selected pixel.

As illustrated in FIG. 6, after the pixel signal is read out with respect to the $m^{th}$ row, the CIS 110 reads out a signal with respect to an $(m+1)^{th}$ row.

To this end, a reset control signal $RG_{m+1}$ of the $(m+1)^{th}$ row is enabled to reset the floating diffusion node FD.

An overflow control signal $OG_{n+1}$ may be enabled with respect to an $(n+1)^{th}$ row at a time when the reset control signal $RG_{m+1}$ of the $(m+1)^{th}$ row is enabled. In response to the overflow control signal $OG_{n+1}$, photodiodes PD of pixels belonging to the $(n+1)^{th}$ row may be reset. For example, while the overflow control signal $OG_{n+1}$ is in the logic high level, electric charges stored in the photodiodes PD are discharged to the pixel voltage Vpix source to reset the photodiodes PD.

As the overflow control signal $OG_{n+1}$ which is in the logic high level goes to the logic low level, accumulation of photocharges may be started by the photodiodes PD. The photodiode PD starting the accumulation of photocharges may accumulate electric charges generated from incident light until a pixel signal of the $(n+1)^{th}$ row is read out.

A reset control signal $RG_{k+1}$, a storage control signal $SG_{k+1}$, and a transmission control signal $TG_{k+1}$ may be simultaneously enabled to '1' with respect to a $(k+1)^{th}$ row at time when the overflow control signal $OG_{n+1}$ of the $(n+1)^{th}$ row is enabled.

Thus, all storage transistors SX, transmission transistors TX, and reset transistors RX of pixels belonging to the $(k+1)^{th}$ row are 'on' to reset all the storage diodes SD and the floating diffusion nodes FD in the $(k+1)^{th}$ row.

For example, while the reset control signal $RG_{k+1}$, the storage control signal $SG_{k+1}$, and the transmission control signal $TG_{k+1}$ are in the logic high level, electric charges stored in the storage diodes SD may be discharged to the pixel voltage Vpix source to reset the storage diodes SD.

As the reset control signal $RG_{k+1}$, the storage control signal $SG_{k+1}$, and the transmission control signal $TG_{k+1}$ go to the logic low level, accumulation of photocharges may be started by the storage diodes SD. That is, accumulation of photocharges is started by the storage diodes SD after the storage diodes SD in the $(k+1)^{th}$ row are reset.

The storage diodes SD starting the accumulation of photocharges may accumulate electric charges generated from incident light until a pixel signal of the $(k+1)^{th}$ row is read out.

In the example embodiment of FIG. 6, the CIS 110 enables the reset control signal $RG_{m+1}$ to reset the floating diffusion nodes FD and then reads out a reset signal with respect to the $(m+1)^{th}$ row. Thus, as illustrated in FIG. 5, ADC is performed on the reset signal (ADC.RST2)

After the reset signal is read out, the CIS 110 enables a transmission control signal $TG_{m+1}$ of the $(m+1)^{th}$ row to transmit the first photocharge accumulated in the storage diode SD to the floating diffusion node FD, and reads out a pixel signal of the floating diffusion node FD. Thus, as illustrated in FIG. 5, ADC is performed on the reset signal based on the storage diode SD (ADC.SD2).

After the pixel signal based on the storage diode SD is read out, the CIS 110 simultaneously enables the transmission control signal $TG_{m+1}$ and the storage control signal $SG_{m+1}$ of the $(m+1)^{th}$ row to transmit the second photocharge accumulated in the photodiode PD to the storage diode SD.

Thus, stored first photocharge and the second photocharge transmitted from the photodiode PD may be combined in the storage diode SD.

A result of combining the first and second photocharges in the storage diode SD is transmitted to the floating diffusion node FD and is then read out.

Accordingly, ADC is performed on a pixel signal based on the photodiodes PD as illustrated in FIG. 5 (ADC.PD2).

Figure 7:
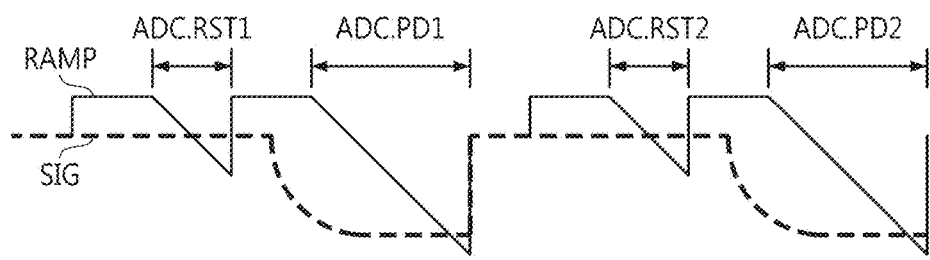
FIG. 7 is a diagram illustrating an ADC operation of an image sensor in a second operating mode, according to an example embodiment of inventive concepts.

FIG. 7 is a diagram illustrating an ADC operation of an image sensor in the second operating mode, according to an example embodiment of inventive concepts. The pixel signal SIG is illustrated with respect to the timing shown in FIG. 7.

Referring to FIG. 5, the CIS 110 continuously performs ADC three times to read a pixel signal from one pixel in the first operating mode as illustrated in FIG. 5, whereas the CIS 110 does not perform ADC (e.g., ADC.SD1 or ADC.SD2) on a pixel signal based on a storage diode SD in the second operating mode as illustrated in FIG. 7.

For example, in the second operating mode, the ADC circuits 160 and 165 of the CIS 110 may convert a reset signal of the floating diffusion node FD of a selected pixel 10 into a digital signal (ADC.RST1). In the second operating mode, ADC performed on the reset signal (ADC.RST1) may be the same as the ADC performed on the reset signal illustrated in FIG. 5 (ADC.RST1).

After ADC is performed on the reset signal, the ADC circuits 160 and 165 may convert an image signal based on a photocharge accumulated in the photodiode PD into a digital signal (ADC.PD1).

For example, the CIS 110 transmits a photocharge accumulated in the storage diodes SD to the floating diffusion node FD while simultaneously enabling the transmission control signal TGm and the storage control signal SGm of the $m^{th}$ row to transmit the photocharge accumulated in the photodiode PD to the floating diffusion node FD, and then reads out a signal of the floating diffusion node FD.

In this case, the previously stored first photocharge and the second photocharge transmitted from the photodiode PD may be combined in the storage diode SD.

As described above, according to an example embodiment of inventive concepts, an operating mode of the CIS 110 may be set to the first operating mode in a situation in which there is an LED.

In the first operating mode, a pixel signal is read out using the storage diode SD controlled to have a relatively long photocharge integration time, and is read out again using the photodiode PD as described above. For example, in the first operating mode, a pixel signal is read out by performing ADC on a selected pixel three times according to the rolling shutter method.

Thus, an object may be recognized even under an LED light which flickers, thereby obtaining a high-quality image.

In contrast, in the second operating mode, a pixel signal is read out by performing ADC on a selected pixel two times according to the global shutter method.

Thus, a frame rate in the second operating mode may be higher than that in the first operating mode. In contrast, although the frame rate in the first operating mode may be lower than that in the second operating mode, an LED flicker mitigation function is provided in the first operating mode.

Accordingly, even when an image of an object using an LED light, such as a signal sign or, a speed-limit sign, is captured, an image sensor according to an example embodiment of inventive concepts is capable of recognizing the object through the LED flicker mitigation function.

Figure 8:
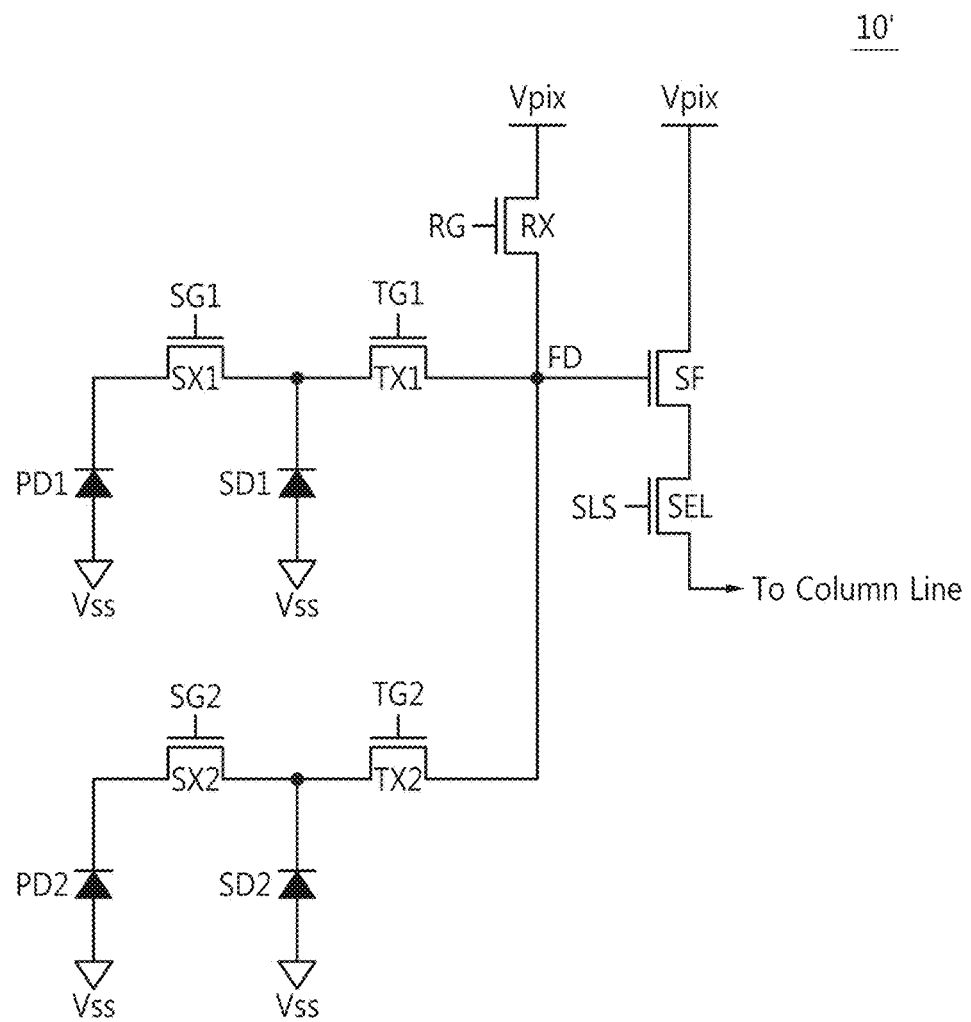
FIG. 8 is a circuit diagram of a common pixel according to an example embodiment of inventive concepts.

FIG. 8 is a circuit diagram of a common pixel 10' according to an example embodiment of inventive concepts. The pixel 10 of FIG. 3 is a single pixel which does not share transistors or any elements with one or more pixels. In contrast, in the common pixel 10' of FIG. 8, a source follower SF and a selection transistor SEL are shared between two neighboring pixels.

A floating diffusion node FD may be also shared between two pixels.

For example, a first pixel may include a first storage transistor SX1, a first transmission transistor TX1, a first reset transistor RX1, a common source follower SF, and a common selection transistor SEL. A second pixel may include a second storage transistor SX2, a second transmission transistor TX2, a second reset transistor RX2, the common source follower SF, and the common selection transistor SEL. In order to decrease the area of pixels, the common pixel unit 10' does not include the overflow transistor OX. That is, the common pixel 10' may not include the overflow transistor OX, compared to the pixel 10 of FIG. 3.

In one example embodiment, one or more transistors may be shared between two pixels or between three or more pixels.

Alternatively, the common pixel 10' may include the overflow transistor OX.

As described above, according to some example embodiments, the structure of a pixel or the number of transistors may be differently set.

FIG. 9 is a block diagram of an electronic system including the image sensor according to some example embodiments of inventive concepts. The electronic system 800 may be implemented by a data processing apparatus, such as a mobile phone, a personal digital assistant (PDA), a portable media player (PMP), an IP TV, or a smart phone that can use or support the MIPI interface. The electronic system 800 includes the image sensor 110, an application processor 810 and a display 850.

A camera serial interface (CSI) host 812 included in the application processor 810 performs serial communication with a CSI device 841 included in the image sensor 110 through CSI. For example, an optical de-serializer (DES) may be implemented in the CSI host 812, and an optical serializer (SER) may be implemented in the CSI device 841.

A display serial interface (DSI) host 811 included in the application processor 810 performs serial communication with a DSI device 851 included in the display 850 through DSI. For example, an optical serializer may be implemented in the DSI host 811, and an optical de-serializer may be implemented in the DSI device 851.

The electronic system 800 may also include a radio frequency (RF) chip 860 which communicates with the application processor 810. A physical layer (PHY) 813 of the electronic system 800 and a PHY of the RF chip 860 communicate data with each other according to a Mobile Industry Processor Interface (MIPI) DigRF standard. The electronic system 800 may further include at least one element among a GPS 820, a storage device 870, a microphone 880, a DRAM 885 and a speaker 890. The electronic system 800 may communicate using Wimax (World Interoperability for Microwave Access) 891, WLAN (Wireless LAN) 893 and/or UWB (Ultra Wideband) 895 etc.

FIG. 10 is a block diagram of an electronic system 900 including the image sensor according to other example embodiments of inventive concepts. Referring to FIG. 14, the electronic system 900 may include the image sensor 110, a processor 910, a memory 920, a display unit 930, and an interface (I/F) 940.

The processor 910 may control the operation of the image sensor 110. The processor 910 may process pixel signals from the image sensor 110 and generate image data.

The memory 920 may store a program for controlling the operation of the image sensor 110 and may also store the image data generated by the processor 910. The processor 910 may execute the program stored in the memory 920. The memory 920 may be formed as a volatile memory or a non-volatile memory.

The display unit 930 may receive the image data from the processor 910 or the memory 920 and display the image data on a display. For example, the display unit 930 may be a liquid crystal display (LCD), a light emitting diode (LED) display, an organic light emitting diode (OLED) display, an active-matrix organic light emitting diode (AMOLED) or a flexible display.

The IF 940 may be formed for the input and output of the image data. The I/F 940 may be implemented as a wireless I/F.

Inventive concepts can also be embodied as computer-readable codes on a computer-readable medium. The computer-readable recording medium is any data storage device that can store data as a program which can be thereafter read by a computer system. Examples of the computer-readable recording medium include read-only memory (ROM), random-access memory (RAM), CD-ROMs, magnetic tapes, floppy disks, and optical data storage devices.

The computer-readable recording medium can also be distributed over network coupled computer systems so that the computer-readable code is stored and executed in a distributed fashion. Also, functional programs, codes, and code segments to accomplish the present general inventive concept can be easily construed by programmers.

According to an example embodiment of inventive concepts, an LED flicker mitigation function is provided. Thus, an object may be recognized even under an LED light which flickers, thereby obtaining a high-quality image.

For example, even when an image of an object which uses an LED light, such as a signal sign or a speed-limit sign, is captured, an image sensor according to an example embodiment of inventive concepts is capable of recognizing the object through the LED flicker mitigation function.

While inventive concepts have been particularly shown and described with reference to the example embodiments illustrated in the drawings, these example embodiments are merely examples. It would be obvious to those of ordinary skill in the art that these embodiments are to cover all modifications, equivalents, and alternatives falling within the scope of inventive concepts. Accordingly, the technical scope of inventive concepts should be defined based on the technical idea of the appended claims.

What is claimed is:
1. An image sensor comprising:
  a pixel array including a plurality of pixels, the plurality of pixels configured to respectively generate pixel signals corresponding to photocharges; and
  an analog-to-digital conversion (ADC) circuit configured to convert the pixel signals into digital pixel signals, the pixel array further including,
    a floating diffusion node,
    a first photoelectric conversion element operably connected to the floating diffusion node, and
    a second photoelectric conversion element operably connected to the floating diffusion node via the first photoelectric conversion element, and
  the ADC circuit is configured to perform ADC on a reset signal of the floating diffusion node, perform ADC on a first pixel signal based on a first photocharge accumulated in the first photoelectric conversion element, and perform ADC on a second pixel signal based on a second photocharge accumulated in the second photoelectric conversion element, wherein the pixel array is configured to send the first photocharge accumulated in the first photoelectric conversion element to the floating diffusion node after the reset signal of the floating diffusion node is generated by the pixel array, wherein the second pixel signal is based on a sum of the second photocharge and a third photocharge, the third photocharge being accumulated in the first photoelectric conversion element.

2. The image sensor of claim 1, wherein the pixel array is configured to combine the second photocharge accumulated in the second photoelectric conversion element with the third photocharge accumulated in the first photoelectric conversion element, and the pixel array is configured to send a result of combining the second and third photocharges to the floating diffusion node.

3. The image sensor of claim 1, wherein the pixel array further comprises:
  a reset transistor operably connected between a pixel voltage source and the floating diffusion node, the reset transistor configured to reset the floating diffusion node;
  a storage transistor operably connected between the first and second photoelectric conversion elements;
  a selection transistor; and
  a source follower operably connected between the pixel voltage source and the selection transistor, the source follower configured to operate based on a voltage at the floating diffusion node.

4. The image sensor of claim 3, wherein the pixel array further comprises:
  an overflow transistor operably connected to the second photoelectric conversion element and configured to reset the second photoelectric conversion element.

5. The image sensor of claim 3, wherein the selection transistor and the source follower are shared between two or more neighboring pixels.

6. The image sensor of claim 1, wherein the image sensor is configured to control a time when the first photoelectric conversion element is reset and a time when the second photoelectric conversion element is reset to be different.

7. The image sensor of claim 1, wherein the image sensor is configured to set a photocharge integration time of the first photoelectric conversion element to be the same as or longer than a photocharge integration time of the second photoelectric conversion element.

8. An image processing system comprising:
  an image sensor including a plurality of pixels, the plurality of pixels configured to respectively output pixel signals corresponding to photocharges, the image sensor configured to perform analog-to-digital conversion (ADC) on the pixel signals to generate digital pixel signals, the image sensor including,
a pixel array including the plurality of pixels, and
an analog-to-digital conversion (ADC) circuit configured to perform the ADC, the pixel array includes,
a floating diffusion node,
a first photoelectric conversion element operably connected to the floating diffusion node, and
a second photoelectric conversion element operably connected to the floating diffusion node via the first photoelectric conversion element, and
in a first operating mode, the ADC circuit is configured to perform ADC on a reset signal of the floating diffusion node, perform ADC on a first pixel signal based on a first photocharge accumulated in the first photoelectric conversion element, and perform ADC on a second pixel signal based on a second photocharge accumulated in the second photoelectric conversion element; and
an image signal processor configured to process the digital pixel signals to generate image data,
wherein the image sensor is configured to operate in the first operating mode in a light-emitting diode (LED) light environment, and operate in a second operating mode in a no LED environment,
the pixel array is configured to send the first photocharge accumulated in the first photoelectric conversion element to the floating diffusion node after the reset signal of the floating diffusion node is output by the pixel array, and
the second pixel signal is based on a sum of the second photocharge and a third photocharge, the third photocharge being accumulated in the first photoelectric conversion element.

9. The image processing system of claim 8, wherein the pixel array is configured to combine the second photocharge accumulated in the second photoelectric conversion element with the third photocharge accumulated in the first photoelectric conversion element, and the pixel array is configured to send a result of combining the second and third photocharges to the floating diffusion node.

10. The image processing system of claim 8, wherein, in the second operating mode and after the pixel array outputs the reset signal of the floating diffusion node, the pixel array is configured to send the second photocharge accumulated in the second photoelectric conversion element to the first photoelectric conversion element at the same time the pixel array sends first photocharge accumulated in the first photoelectric conversion element to the floating diffusion node.

11. An image processing system comprising:
a pixel array including a plurality of pixels, at least one pixel of the plurality of pixels further including,
a floating diffusion node,
a first photoelectric conversion element operably connected to the floating diffusion node, and
a second photoelectric conversion element operably connected to the floating diffusion node via the first photoelectric conversion element; and
a readout circuit configured to read a photocharge accumulated at the floating diffusion node a first number of times in a first mode and a second number of times in a second mode.

12. The image processing system of claim 11, wherein the first mode corresponds to a light-emitting diode (LED) light environment and the second mode corresponds to a no LED environment.

13. The image processing system of claim 12, wherein the first number of times is greater than the second number of times.

14. The image processing system of claim 11, further comprising:
a controller configured to control the first photoelectric conversion element to have a longer integration time than the second photoelectric conversion element in the first mode.

15. The image processing system of claim 14, wherein the controller is configured to control the first photoelectric conversion element and the second photoelectric conversion element to have a same integration time in the second mode.

* * * * *